United States Patent
Yang et al.

(10) Patent No.: US 9,155,137 B2
(45) Date of Patent: Oct. 6, 2015

(54) LOAD DRIVING APPARATUS RELATED TO LIGHT-EMITTING DIODE LAMP AND METHOD THEREOF

(71) Applicant: FSP TECHNOLOGY INC., Taoyuan County (TW)

(72) Inventors: Cheng-Hui Yang, Taoyuan County (TW); Ching-Chia Chu, Taoyuan County (TW)

(73) Assignee: FSP TECHNOLOGY INC., Taoyuan (TW)

(*) Notice: Subject to any disclaimer, the term of this patent is extended or adjusted under 35 U.S.C. 154(b) by 315 days.

(21) Appl. No.: 13/831,874

(22) Filed: Mar. 15, 2013

(65) Prior Publication Data

US 2014/0015412 A1    Jan. 16, 2014

(30) Foreign Application Priority Data

Jul. 12, 2012   (CN) .......................... 2012 1 0241192

(51) Int. Cl.
*H05B 33/08*   (2006.01)
(52) U.S. Cl.
CPC .......... *H05B 33/0809* (2013.01); *H05B 33/089* (2013.01); *H05B 33/0815* (2013.01); *Y02B 20/347* (2013.01)

(58) Field of Classification Search
None
See application file for complete search history.

(56) References Cited

U.S. PATENT DOCUMENTS

| | | | |
|---|---|---|---|
| 2009/0015174 A1* | 1/2009 | Huang et al. .................. | 315/250 |
| 2012/0104964 A1* | 5/2012 | Hughes ......................... | 315/291 |
| 2012/0139442 A1* | 6/2012 | Soleno .......................... | 315/294 |
| 2012/0326625 A1* | 12/2012 | Sharrah et al. ................ | 315/291 |

* cited by examiner

*Primary Examiner* — Long Nguyen
(74) *Attorney, Agent, or Firm* — Jianq Chyun IP Office

(57) ABSTRACT

A load driving apparatus related to an LED lamp and a method thereof are provided. The load driving apparatus includes a PWM-based power converter and a determination circuit. The PWM-based power converter is coupled to the LED lamp, and is configured to: generate a DC operation voltage of the LED lamp; and control a current flowing through the LED lamp in response to a dimming signal, so as to adjust a brightness of the LED lamp. The determination circuit is coupled to the PWM-based power converter and the LED lamp, and is configured to: receive the DC operation voltage; and stop conducting the DC operation voltage to the LED lamp in case that a lamp-off condition of the LED lamp is satisfied.

17 Claims, 4 Drawing Sheets

LOAD DRIVING APPARATUS RELATED TO LIGHT-EMITTING DIODE LAMP AND METHOD THEREOF

CROSS-REFERENCE TO RELATED APPLICATION

This application claims the priority benefit of china application serial no. 201210241192.6, filed on Jul. 12, 2012; the entirety of the above-mentioned patent application is hereby incorporated by reference herein and made a part of this specification.

BACKGROUND

1. Technical Field

The invention relates to a load driving apparatus. Particularly, the invention relates to a load driving apparatus related to a light-emitting diode (LED) lamp and a method thereof.

2. Related Art

In the past two decades, engineers dedicated to develop new illumination light sources. The European Union specifically makes a "rainbow project", and provides four conditions requiring the new illumination light source to satisfy, which are respectively high efficiency, energy saving, pollution-free, natural light simulation.

Since a light-emitting diode (LED) has the above advantages, and is incomparable relative to a conventional illumination light source (for example, an incandescent lamp and a fluorescent lamp), the LED is regarded as the most valuable "green" light source in the $21^{st}$ century, and replaces the incandescent lamp and the fluorescent lamp to become a leading product in the market.

Regarding an LED lighting device having a pulse width modulation (PWM)-based structure and a dimming function, a driving device therein that is used for providing an operation voltage to an LED lamp generally turns off the LED lamp by directly pulling down the operation voltage of the LED lamp, so as to achieve the purpose of lamp-off.

However, the conventional technical manner/solution for lamp-off probably causes malfunction or failure of a PWM controller in the driving device (due to that a working voltage supplied to the PWM controller is lower than an under voltage lockout (UVLO) voltage of the PWM controller), which results in a fact that the LED lamp cannot be again turned on after it is turned off unless the PWM controller in the driving device is restarted (for example, high voltage (HV) start).

In order to resolve the problem that the LED lamp cannot be again turned on after it is turned off, a feasible solution is to increase winding turns of a transformer corresponding to the working voltage of the PWM controller in the driving device, though a voltage regulator circuit has to be additionally configured to provide the working voltage required by the PWM controller. In this way, not only additional power loss is produced to reduce conversion efficiency, additional cost thereof is also high.

On the other hand, under a design condition that the PWM controller does not have a latch over current protection (OCP) function, once the LED lamp is shorted, the PWM controller periodically/intermittently outputs a PWM signal with a very short duty cycle (since it is easy to reach an OCP point built in the PWM controller) to switch a power switch transistor in the driving device, which causes unnecessary and repetitive high power loss.

SUMMARY

The invention is directed to a load driving apparatus suitable for a light-emitting diode (LED) lamp and a method thereof, which effectively resolves the problem mentioned in the related art.

An embodiment of the invention provides a load driving apparatus at least adapted to an LED lamp, which includes a pulse width modulation (PWM)-based power converter and a determination circuit. The PWM-based power converter is coupled to the LED lamp, and generates a direct current (DC) operation voltage of the LED lamp, and controls a current flowing through the LED lamp in response to a dimming signal, so as to adjust a brightness of the LED lamp. The determination circuit is coupled to the PWM-based power converter and the LED lamp, and receives the DC operation voltage, and stops conducting the DC operation voltage to the LED lamp in case that a lamp-off condition of the LED lamp is satisfied.

In an embodiment of the invention, the determination circuit further conducts the DC operation voltage to the LED lamp in case that a lamp-on condition of the LED lamp is satisfied.

In an embodiment of the invention, the determination circuit includes a comparator, an N-type switch transistor, and a P-type switch transistor. A positive input terminal of the comparator receives the dimming signal, and a negative input terminal of the comparator receives a lamp-off reference signal related to the LED lamp. A gate of the N-type switch transistor is coupled to an output terminal of the comparator, and a source of the N-type switch transistor is coupled to a safety ground. A gate of the P-type switch transistor is coupled to a drain of the N-type switch transistor, a source of the P-type switch transistor receives the DC operation voltage, and a drain of the P-type switch transistor is coupled to a high-side of the LED lamp.

In an embodiment of the invention, when a level of the dimming signal is higher than a level of the lamp-off reference signal, the lamp-on condition of the LED lamp is satisfied, and when the level of the dimming signal is lower than the level of the lamp-off reference signal, the lamp-off condition of the LED lamp is satisfied.

In an embodiment of the invention, the determination circuit further includes a first to a fourth resistors and a capacitor. The first resistor is coupled between the output terminal of the comparator and the gate of the N-type switch transistor. The second resistor is coupled between the gate of the N-type switch transistor and the safety ground. The capacitor and the second resistor are coupled in parallel. The third resistor is coupled between the drain of the N-type switch transistor and the gate of the P-type switch transistor. The fourth resistor is coupled between the source and the gate of the P-type switch transistor.

In an embodiment of the invention, the load driving apparatus further includes a short protection circuit, which is coupled to the determination circuit, and controls the determination circuit to stop conducting the DC operation voltage to the LED lamp when the LED lamp is shorted.

In an embodiment of the invention, the short protection circuit includes a diode. An anode of the diode is coupled to the gate of the N-type switch transistor, and a cathode of the diode is coupled to the drain of the P-type switch transistor.

In an embodiment of the invention, the PWM-based power converter includes a first rectification-filtering circuit, a transformer, an N-type power switch transistor, a second rectification-filtering circuit and a PWM controller. The first rectification-filtering circuit receives an alternating current (AC)

input voltage, and rectifies and filters the AC input voltage to generate and output a DC output voltage. The transformer has a primary side and a first secondary side, where a first end of the primary side of the transformer receives the DC output voltage.

A drain of the N-type power switch transistor is coupled to a second end of the primary side of the transformer, a source of the N-type power switch transistor is coupled to a dangerous ground, and a gate of the N-type power switch transistor receives a PWM signal. The second rectification-filtering circuit is coupled to the first secondary side of the transformer, and rectifies and filters an AC induction voltage on the first secondary side of the transformer to generate and output the DC operation voltage. The PWM controller is coupled to the N-type power switch transistor, and generates the PWM signal to switch the N-type power switch transistor.

In an embodiment of the invention, the transformer further includes a second secondary side, and in this case, the PWM-based power converter further includes a third rectification-filtering circuit and a voltage-current control circuit. The third rectification-filtering circuit is coupled to the second secondary side of the transformer, and rectifies and filters an AC induction voltage on the second secondary side of the transformer to generate and output a DC working voltage. The voltage-current control circuit is coupled to the second and the third rectification-filtering circuits, the determination circuit and a low-side of the LED lamp, and is operated under the DC working voltage, and the voltage-current control circuit controls the current flowing through the LED lamp in response to the dimming signal, so as to adjust the brightness of the LED lamp, and provides the lamp-off reference signal.

In an embodiment of the invention, the PWM-based power converter further includes an electromagnetic interference filter, which is coupled between the AC input voltage and the first rectification-filtering circuit, and filters an electromagnetic interference of the AC input voltage, or prevents the PWM-based power converter from polluting a public power grid network that supplies the AC input voltage.

In an embodiment of the invention, the load driving apparatus further includes a dimmer, which is coupled to the determination circuit and the voltage-current control circuit, and provides the dimming signal.

In an embodiment of the invention, the determination circuit and/or the short protection circuit are capable of being integrated with the PWM-based power converter.

Another embodiment of the invention provides a load driving method at least adapted to an LED lamp, which includes following steps. Under a PWM-based structure, a DC operation current of the LED lamp is provided. A dimming signal is provided to control a current flowing through the LED lamp in response to a dimming requirement, so as to adjust a brightness of the LED lamp. It is stopped conducting the DC operation voltage to the LED lamp in case that a lamp-off condition of the LED lamp is satisfied.

In an embodiment of the invention, the load driving method further includes conducting the DC operation voltage to the LED lamp in case that a lamp-on condition of the LED lamp is satisfied.

In an embodiment of the invention, when a level of the dimming signal is higher than a level of a lamp-off reference signal, the lamp-on condition of the LED lamp is satisfied, and when the level of the dimming signal is lower than the level of the lamp-off reference signal, the lamp-off condition of the LED lamp is satisfied.

In an embodiment of the invention, the load driving method further includes stopping conducting the DC operation voltage to the LED lamp when the LED lamp is shorted.

According to the above descriptions, in the load driving apparatus adapted to the LED lamp and the method thereof, it is stopped conducting the generated DC operation voltage to the LED lamp when the lamp-off condition of the LED lamp is satisfied, and the generated DC operation voltage is conducted to the LED lamp when the lamp-on condition of the LED lamp is satisfied. Under either of the lamp-on condition and the lamp-off condition, the DC operation voltage of the LED lamp generated by the PWM-based power converter is not influenced. Therefore, the PWM controller is not malfunctioned or failed as the LED lamp is in a lamp-off state (due to that a working voltage supplied to the PWM controller is still higher than an under voltage lockout (UVLO) voltage of the PWM controller), so that the LED lamp is still capable of being turned on after it is turned off (as long as the lamp-on condition of the LED lamp is satisfied) without restarting the PWM controller.

On the other hand, since under either of the lamp-on condition and the lamp-off condition, the DC operation voltage of the LED lamp generated by the PWM-based power converter is not influenced. Therefore, an original power supply structure of the PWM-based power converter is unnecessary to be changed, so that additional power loss is avoided to maintain the conversion efficiency, and additional cost thereof is relatively low (compared to the method of the related art).

Moreover, even if under a design condition that the PWM controller does not have a latch over current protection (OCP) function, once the LED lamp is shorted, it is immediately and continuously stopped transmitting the generated DC operation voltage to the shorted LED lamp, i.e. a transmission path for supplying the generated DC operation voltage to the LED lamp is cut off. In this case, since the PWM-based power converter is not coupled to a load (i.e. non-load), the PWM controller is maintained to a non-load operation of low power consumption, so as to avoid unnecessary and repetitive large power loss until a new LED lamp is used for replacement.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
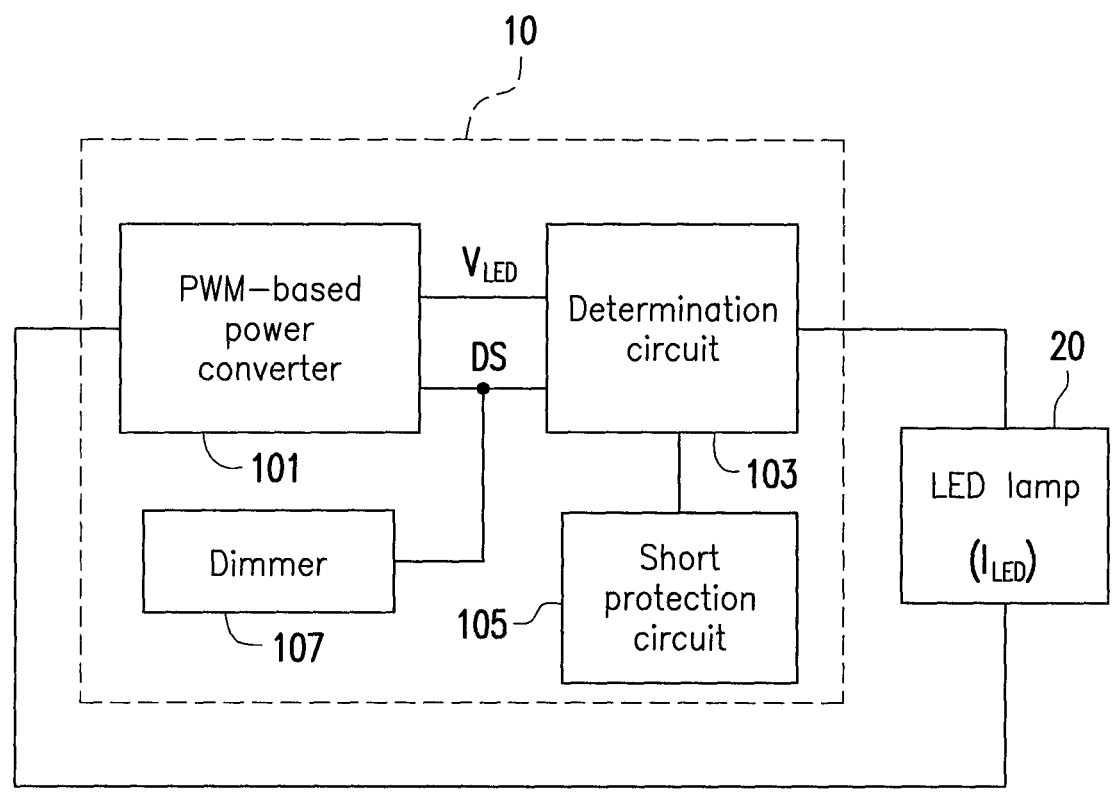
FIG. 1 is a schematic diagram of a load driving apparatus 10 adapted to a light-emitting diode (LED) lamp 20 according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a load driving apparatus 10 adapted to a light-emitting diode (LED) lamp 20 according to an embodiment of the invention. Referring to FIG. 1, the load driving apparatus 10 includes a pulse width modulation (PWM)-based power converter 101, a determination circuit 103, a short protection circuit 105 and a dimmer 107.

In the present embodiment, the PWM-based power converter 101 is coupled to the LED lamp 20, and a power conversion topology thereof can be a flyback power conversion topology, a forward power conversion topology, a boost power conversion topology, a buck power conversion topology, a boost-buck power conversion topology, or a push-pull power conversion topology, etc., though the invention is not limited thereto, which is determined according to an actual design/application requirement.

The PWM-based power converter 101 generates a direct current (DC) operation voltage $V_{LED}$ of the LED lamp 20, and controls a current $I_{LED}$ flowing through the LED lamp 20 in response to a dimming signal DS come from the dimmer 107, so as to (linearly or nonlinearly, which is not limited by the invention) adjust the brightness of the LED lamp 20.

The determination circuit 103 is coupled to the PWM-based power converter 101 and the LED lamp 20, and receives the DC operation voltage $V_{LED}$ from the PWM-based power converter 101, and stops conducting the received DC operation voltage $V_{LED}$ to the LED lamp 20 in case that a lamp-off condition (which is described in detail later) of the LED lamp 20 is satisfied. Even more, the determination circuit 103 conducts the received DC operation voltage $V_{LED}$ to the LED lamp 20 in case that a lamp-on condition (which is described in detail later) of the LED lamp 20 is satisfied.

The short protection circuit 105 is coupled to the determination circuit 103, and controls the determination circuit 103 to stop conducting the received DC operation voltage $V_{LED}$ to the LED lamp 20 when the LED lamp 20 is shorted, and controls the determination circuit 103 to conduct the received DC operation voltage $V_{LED}$ to the LED lamp 20 only when a new (good) LED lamp is used for replacement.

Figure 2:
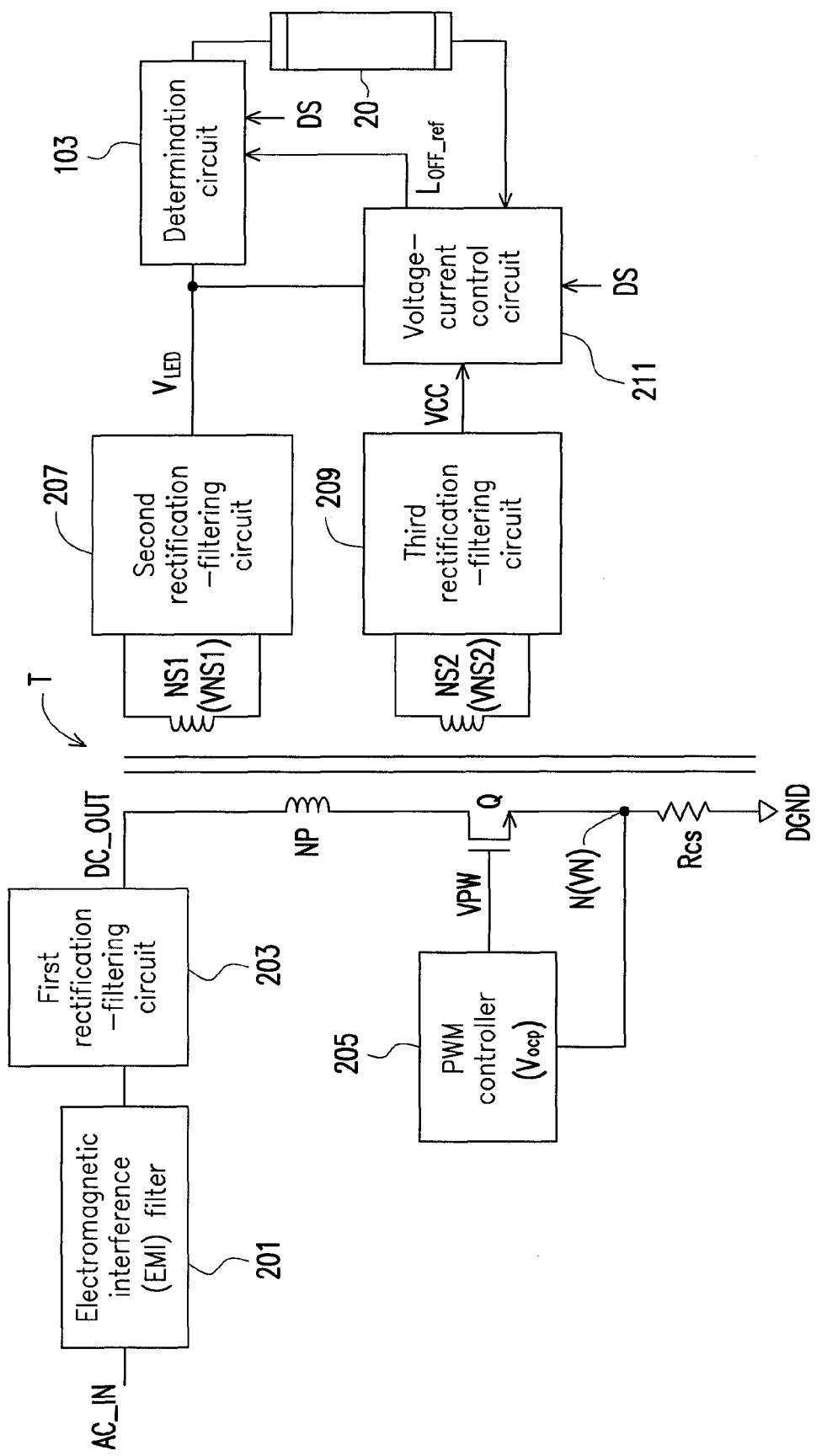
FIG. 2 is a schematic diagram of a PWM-based power converter 101 of FIG. 1.

In detail, FIG. 2 is a schematic diagram of the PWM-based power converter 101 of FIG. 1. Referring to FIG. 1 and FIG. 2, the PWM-based power converter 101 includes an electromagnetic interference (EMI) filter 201, a first rectification-filtering circuit 203, a transformer T, an N-type power switch transistor Q, a resistor Rcs, a PWM controller 205, a second rectification-filtering circuit 207, a third rectification-filtering circuit 209 and a (constant) voltage-current control circuit 211.

In the present embodiment, the EMI filter 201 is coupled between an alternating current (AC) input voltage AC_IN and (an input of) the first rectification-filtering circuit 203, and filters an electromagnetic interference of the AC input voltage AC_IN, or prevents the PWM-based power converter 101 from polluting a public power grid network (for example, a power company, though the invention is not limited thereto) that supplies the AC input voltage AC_IN.

The first rectification-filtering circuit 203 receives the AC input voltage AC_IN from the EMI filter 201, and rectifies and filters the received AC input voltage AC_IN to generate and output a DC output (high) voltage DC_OUT. In the present embodiment, the first rectification-filtering circuit 203 can be composed of a full-bridge/half-bridge rectifier and at least an output filtering capacitor, though the invention is not limited thereto.

Certainly, in other embodiments of the invention, the EMI filter 201 is optional, and the first rectification-filtering circuit 203 is changed to directly receive the AC input voltage AC_IN supplied by the public power grid network for rectifying and filtering, so as to generate and output the DC output (high) voltage DC_OUT. Whether the EMI filter 201 is used is determined according to an actual design/application requirement.

The (isolation) transformer T has a primary side NP, a first secondary side NS1 and a second secondary side NS2, where a first end of the primary side NP of the (isolation) transformer T receives the DC output (high) voltage DC_OUT output by the first rectification-filtering circuit 203.

A drain of the N-type power switch transistor Q is coupled to a second end of the primary side NP of the transformer T, a source of the N-type power switch transistor Q is coupled to a dangerous ground DGMD through the resistor Rcs, and a gate of the N-type power switch transistor Q receives a PWM signal VPW from the PWM controller 205.

The PWM controller 205 is coupled to the N-type power switch transistor Q, and generates the PWM signal VPW to switch (i.e. turn on and turn off) the N-type power switch transistor Q. Moreover, in case that the PWM controller 205 has an over-current protection (OCP) function, an OCP reference voltage Vocp can be built therein.

In this case, the PWM controller 205 compares the inbuilt OCP reference voltage Vocp with a voltage VN on a node N (i.e. a cross voltage of the resistor Rcs) to determine whether an over current phenomenon is generated. Once the over current phenomenon is generated, the PWM controller 205 (immediately) stops generating the PWM signal VPW to avoid damaging the PWM-based power converter 101 until the over current phenomenon disappears.

Certainly, in other embodiments of the invention, the resistor Rcs is optional (for example, in case that the PWM controller 205 does not have the OCP function), and the source of the N-type power switch transistors Q is changed to be directly coupled to the dangerous ground DGND. Whether the resistor Rcs is used is determined according to an actual design/application requirement.

The second rectification-filtering circuit 207 is coupled to the first secondary side NS1 of the transformer T, and rectifies and filters an AC induction voltage VNS1 on the first secondary side NS1 of the transformer T to generate and output the DC operation voltage $V_{LED}$ of the LED lamp 20 to the determination circuit 103. In the present embodiment, the second rectification-filtering circuit 207 is composed of at least one diode and an output filtering capacitor, though the invention is not limited thereto.

The third rectification-filtering circuit 209 is coupled to the second secondary side NS2 of the transformer T, and rectifies and filters an AC induction voltage VNS2 on the second secondary side NS2 of the transformer T to generate and output a DC working voltage VCC. Similarly, the third rectification-filtering circuit 209 can also be composed of at least one diode and an output filtering capacitor, though the invention is not limited thereto.

It should be noticed that in an actual application, the PWM-based power converter 101 may also include a feedback unit (not shown), which provides a feedback signal related to the DC operation voltage $V_{LED}$ and/or the DC working voltage VCC to the PWM controller 205 through a voltage-dividing feedback method or a photo-coupling feedback method. In this way, the PWM controller 205 may adjust and stabilize the DC operation voltage $V_{LED}$ and/or the DC working voltage VCC.

The (constant) voltage-current control circuit 211 is coupled to outputs of the second rectification-filtering circuit 207 and the third rectification-filtering circuit 209, the determination circuit 103, the dimmer 107 and a low-side of the LED lamp 20. The (constant) voltage-current control circuit 211 is operated under the DC working voltage VCC come from the third rectification-filtering circuit 209, and controls the current $I_{LED}$ flowing through the LED lamp 20 in response to the dimming signal DS of the dimmer 107, so as to (linearly or nonlinearly, which is not limited by the invention) adjust the brightness of the LED lamp 20, and provide a lamp-off reference signal $L_{OFF\_ref}$ related to the LED lamp 20 to the determination circuit 103.

In this way, the dimmer 107 is coupled to the determination circuit 103 and the (constant) voltage-current control circuit 211, and provides the dimming signal DS to the determination circuit 103 and the (constant) voltage-current control circuit 211. In the present embodiment, the dimmer 107 generates and provides the dimming signal DS to the determination circuit 103 and the (constant) voltage-current control circuit 211 in response to an operation (wired/wireless operation) of the user, though the invention is not limited thereto. In other words, the user can communicate with the dimmer 107 through any wired/wireless communication mechanism, which is determined according to an actual design/application requirement.

Figure 3:
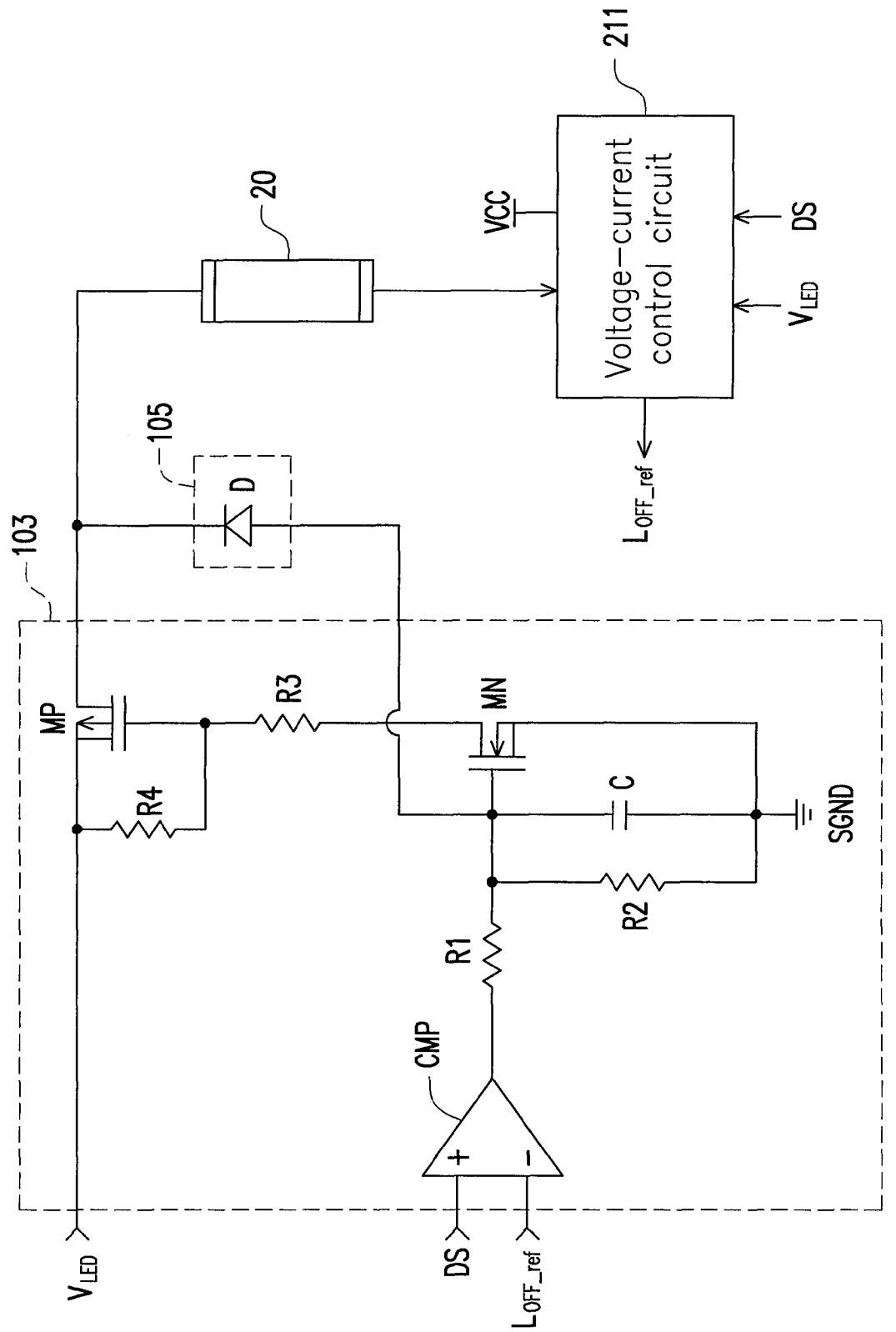
FIG. 3 is a schematic diagram of a determination circuit 103 and a short protection circuit 105 of FIG. 1.

On the other hand, FIG. 3 is a schematic diagram of the determination circuit 103 and the short protection circuit 105 of FIG. 1. Referring to FIG. 1-FIG. 3, the determination circuit 103 includes a comparator CMP, an N-type switch transistor MN, a P-type switch transistor MP, resistors R1-R4 and a capacitor C. A positive input terminal (+) of the comparator CMP receives the dimming signal DS from the dimmer 107, and a negative input terminal (−) of the comparator CMP receives the lamp-off reference signal $L_{OFF\_ref}$ related to the LED lamp 20 from the (constant) voltage-current control circuit 211.

A gate of the N-type switch transistor MN is coupled to an output terminal of the comparator CMP through the resistor R1 (in other words, the resistor R1 is coupled between the output terminal of the comparator CMP and the gate of the N-type switch transistor MN), and a source of the N-type switch transistor MN is coupled to a safety ground SGND. The resistor R2 is coupled between the gate of the N-type switch transistor MN and the safety ground SGND, and the capacitor C and the resistor R2 are coupled in parallel.

A gate of the P-type switch transistor MP is coupled to a drain of the N-type switch transistor MN through the resistor R3 (in other words, the resistor R3 is coupled between the drain of the N-type switch transistor MN and the gate of the P-type switch transistor MP), a source of the P-type switch transistor MP receives the DC operation voltage $V_{LED}$ of the LED lamp 20 (from the second rectification-filtering circuit 207), and a drain of the P-type switch transistor MP is coupled to a high-side of the LED lamp 20. The resistor R4 is coupled between the source and the gate of the P-type switch transistor MP.

It should be noticed that in case that the operation of the determination circuit 103 is not influenced, the resistors R1-R4 and the capacitor C are optional. Whether the resistors R1-R4 and the capacitor C are used is determined according to an actual design/application requirement. Certainly, other circuit structures different to that of the determination circuit 103 of FIG. 3 can also be used as long as the same operating method as that of the determination circuit 103 is maintained.

In the present embodiment, when a level of the dimming signal DS is higher than a level of the lamp-off reference signal $L_{OFF\_ref}$, the lamp-on condition of the LED lamp 20 is satisfied, and when the level of the dimming signal DS is lower than the level of the lamp-off reference signal $L_{OFF\_ref}$, the lamp-off condition of the LED lamp 20 is satisfied.

Moreover, the short protection circuit 105 may include a diode D. An anode of the diode D is coupled to the gate of the N-type switch transistor MN, and a cathode of the diode D is coupled to the drain of the P-type switch transistor MP (and the high-side of the LED lamp 20). Certainly, other circuit structures different to that of the short protection circuit 105 of FIG. 3 can also be used as long as the same operating method as that of the short protection circuit 105 is maintained.

In the present embodiment, the determination circuit 103 and/or the short protection circuit 105 can be integrated with the PWM-based power converter 101. In other words, the determination circuit 103, the short protection circuit 105 and the PWM-based power converter 101 can be integrated. Whether the determination circuit 103 and/or the short protection circuit 105 are integrated with the PWM-based power converter 101 is determined according to an actual design/application requirement.

According to the above descriptions, when the lamp-on condition of the LED lamp 20 is satisfied, the level of the dimming signal DS provided by the dimmer 107 is higher than the level of the lamp-off reference signal $L_{OFF\_ref}$ provided by the (constant) voltage-current control circuit 211. In this case, the N-type switch transistor MN is turned on in response to the "high" level at the output terminal of the comparator CMP, and the P-type switch transistor MP is turned on as the N-type switch transistor MN is turned on. In this way, the determination circuit 103 conducts the received DC operation voltage $V_{LED}$ to the LED lamp 20.

When the determination circuit 103 conducts the received DC operation voltage $V_{LED}$ to the LED lamp 20, the (constant) voltage-current control circuit 211 controls the current $I_{LED}$ flowing through the LED lamp 20 in response to the dimming signal DS from the dimmer 107, so as to (linearly or nonlinearly, which is not limited by the invention) adjust the brightness of the LED lamp 20 for achieving the purpose of light dimming.

On the other hand, when the lamp-off condition of the LED lamp 20 is satisfied, the level of the dimming signal DS provided by the dimmer 107 is lower than the level of the lamp-off reference signal $L_{OFF\_ref}$ provided by the (constant) voltage-current control circuit 211. In this case, the N-type switch transistor MN is turned off in response to the "low" level at the output terminal of the comparator CMP, and the P-type switch transistor MP is turned off as the N-type switch transistor MN is turned off. In this way, the determination circuit 103 stops conducting the received DC operation voltage $V_{LED}$ to the LED lamp 20.

Moreover, in case that the LED lamp 20 is shorted, the diode D in the short protection circuit 105 is conducted as the LED lamp 20 is shorted (due to that a high voltage at the high-side of the LED lamp 20 is pulled down to a low voltage at the low-side thereof). In this case, the N-type switch transistor MN is turned off in response to the low voltage at the low-side of the LED lamp 20, and the P-type switch transistor MP is turned off as the N-type switch transistor MP is turned off. In this way, the determination circuit 103 stops conducting the received DC operation voltage $V_{LED}$ to the LED lamp 20. Obviously, once the LED lamp 20 is shorted, the short protection circuit 105 controls the determination circuit 103 to stop conducting the received DC operation voltage $V_{LED}$ to the LED lamp 20.

In case that the determination circuit 103 stops conducting the received DC operation voltage $V_{LED}$ to the LED lamp 20 as the LED lamp 20 is shorted, it is regarded as that a transmission path for supplying the generated DC operation voltage $V_{LED}$ to the LED lamp 20 is cut off. In this case, since the PWM-based power converter 101 is not coupled to a load (i.e. non-load), the PWM controller 205 is maintained to a non-load operation of low power consumption until a new LED lamp is used for replacement.

Figure 4:
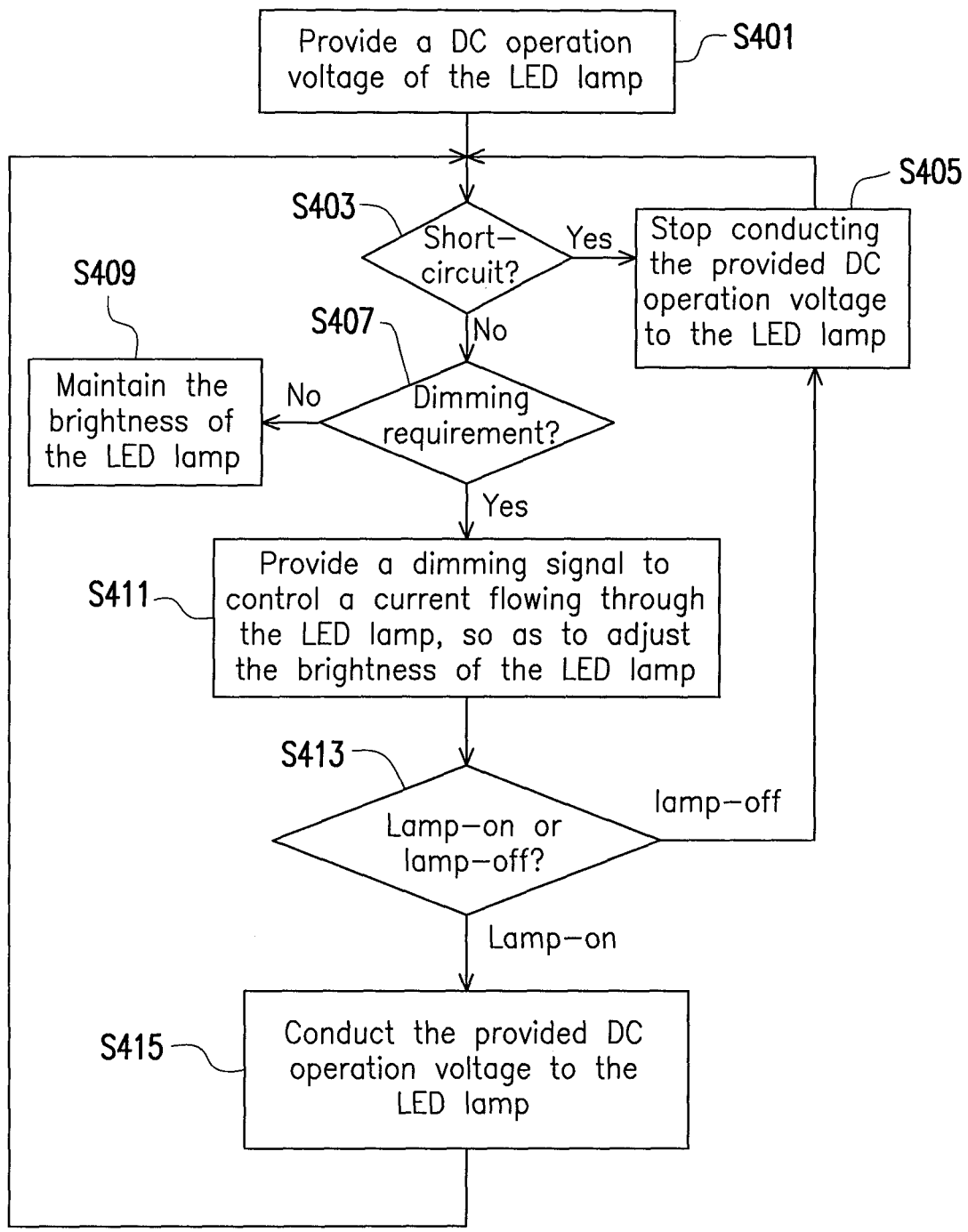
FIG. 4 is a flowchart illustrating a load driving method adapted to an LED lamp according to an embodiment of the invention.

According to the aforementioned disclosures/instructions of various embodiments, FIG. 4 is a flowchart illustrating a load driving method adapted to an LED lamp according to an embodiment of the invention. Referring to FIG. 4, the load driving method of the present embodiment includes following steps.

Under a PWM-based structure, a DC operation current of the LED lamp is provided (step S401).

It is determined whether the LED lamp is shorted (step S403).

In case that the LED lamp is shorted, it is stopped conducting the DC operation voltage to the LED lamp (step S405), otherwise (i.e. the LED lamp is not shorted), it is further determined whether there is a dimming requirement (step S407).

If there is none dimming requirement, the (original) brightness of the LED lamp is maintained (step S409).

If there is the dimming requirement, a dimming signal is provided to control a current flowing through the LED lamp, so as to (linearly or nonlinearly) adjust a brightness of the LED lamp (step S411).

During a process of adjusting the brightness of the LED lamp, it is continuously determined whether the lamp-on condition or the lamp-off condition of the LED lamp is satisfied (step S413).

In case that the lamp-on condition of the LED lamp is satisfied (for example, when a level of the provided dimming signal is higher than a level of the lamp-off reference signal of the LED lamp, it is regarded as that the lamp-on condition of the LED lamp is satisfied), the generated DC operation voltage is conducted to the LED lamp (step S415), and then the step S403 is returned to determine whether the LED lamp is shorted.

In case that the lamp-off condition of the LED lamp is satisfied (for example, when the level of the provided dimming signal is lower than the level of the lamp-off reference signal of the LED lamp, it is regarded as that the lamp-off condition of the LED lamp is satisfied), it is stopped conducting the provided DC operation voltage to the LED lamp (step S405), and then the step S403 is returned to determine whether the LED lamp is shorted.

Obviously, regardless of whether the LED lamp is in a lamp-on state or a lamp-off state, it is continuously determined whether the LED lamp is shorted (step S403).

According to the above descriptions, in the load driving apparatus adapted to the LED lamp and the method thereof, it is stopped conducting the generated DC operation voltage to the LED lamp when the lamp-off condition of the LED lamp is satisfied, and the generated DC operation voltage is conducted to the LED lamp when the lamp-on condition of the LED lamp is satisfied. Under either of the lamp-on condition and the lamp-off condition, the DC operation voltage of the LED lamp generated by the PWM-based power converter is not influenced. Therefore, the PWM controller is not malfunctioned or failed as the LED lamp is in the lamp-off state (due to that a working voltage supplied to the PWM controller is still higher than an under voltage lockout (UVLO) voltage of the PWM controller), so that the LED lamp is still capable of being turned on after it is turned off (as long as the lamp-on condition of the LED lamp is satisfied) without restarting the PWM controller.

On the other hand, since under either of the lamp-on condition and the lamp-off condition, the DC operation voltage of the LED lamp generated by the PWM-based power converter is not influenced. Therefore, an original power supply structure of the PWM-based power converter is unnecessary to be changed, so that additional power loss is avoided to maintain the conversion efficiency, and additional cost thereof is relatively low (compared to the method of the related art).

Moreover, even if under a design condition that the PWM controller does not have a latch OCP function, once the LED lamp is shorted, it is immediately and continuously stopped transmitting the generated DC operation voltage to the shorted LED lamp, i.e. a transmission path for supplying the generated DC operation voltage to the LED lamp is cut off. In this case, since the PWM-based power converter is not coupled to a load (i.e. non-load), the PWM controller is maintained to a non-load operation of low power consumption, so as to avoid unnecessary and repetitive large power loss until a new LED lamp is used for replacement.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A load driving apparatus, at least adapted to a light-emitting diode (LED) lamp, the load driving apparatus comprising:
   a pulse width modulation (PWM)-based power converter, coupled to the LED lamp, and configured to:
   generate a direct current (DC) operation voltage of the LED lamp; and
   control a current flowing through the LED lamp in response to a dimming signal, so as to adjust a brightness of the LED lamp; and
   a determination circuit, coupled to the PWM-based power converter and the LED lamp, and configured to:
   receive the DC operation voltage; and
   stop conducting the DC operation voltage to the LED lamp in case that a lamp-off condition of the LED lamp is satisfied.

2. The load driving apparatus as claimed in claim 1, wherein the determination circuit is further configured to conduct the DC operation voltage to the LED lamp in case that a lamp-on condition of the LED lamp is satisfied.

3. The load driving apparatus as claimed in claim 2, wherein the determination circuit comprises:
   a comparator, having a positive input terminal receiving the dimming signal, and a negative input terminal receiving a lamp-off reference signal related to the LED lamp;
   an N-type switch transistor, having a gate coupled to an output terminal of the comparator, and a source coupled to a safety ground; and
   a P-type switch transistor, having a gate coupled to a drain of the N-type switch transistor, a source receiving the DC operation voltage, and a drain coupled to a high-side of the LED lamp.

4. The load driving apparatus as claimed in claim 3, wherein
   when a level of the dimming signal is higher than a level of the lamp-off reference signal, the lamp-on condition of the LED lamp is satisfied, and
   when the level of the dimming signal is lower than the level of the lamp-off reference signal, the lamp-off condition of the LED lamp is satisfied.

5. The load driving apparatus as claimed in claim 3, wherein the determination circuit further comprises:

a first resistor, coupled between the output terminal of the comparator and the gate of the N-type switch transistor;

a second resistor, coupled between the gate of the N-type switch transistor and the safety ground;

a capacitor, coupled in parallel with the second resistor;

a third resistor, coupled between the drain of the N-type switch transistor and the gate of the P-type switch transistor; and a fourth resistor, coupled between the source and the gate of the P-type switch transistor.

6. The load driving apparatus as claimed in claim 5, wherein the determination circuit is integrated with the PWM-based power converter.

7. The load driving apparatus as claimed in claim 3, further comprising:

a short protection circuit, coupled to the determination circuit, and configured to control the determination circuit to stop conducting the DC operation voltage to the LED lamp when the LED lamp is shorted.

8. The load driving apparatus as claimed in claim 7, wherein the short protection circuit comprises:

a diode, having an anode coupled to the gate of the N-type switch transistor, and a cathode coupled to the drain of the P-type switch transistor.

9. The load driving apparatus as claimed in claim 8, wherein the short protection circuit is integrated with the PWM-based power converter.

10. The load driving apparatus as claimed in claim 3, wherein the PWM-based power converter comprises:

a first rectification-filtering circuit, configured to receive an alternating current (AC) input voltage, and rectify and filter the AC input voltage, so as to generate and output a DC output voltage;

a transformer, having a primary side and a first secondary side, wherein a first end of the primary side receives the DC output voltage;

an N-type power switch transistor, having a drain coupled to a second end of the primary side, a source coupled to a dangerous ground, and a gate receiving a PWM signal;

a second rectification-filtering circuit, coupled to the first secondary side, and configured to rectify and filter an AC induction voltage on the first secondary side, so as to generate and output the DC operation voltage; and a PWM controller, coupled to the N-type power switch transistor, and configured to generate the PWM signal to switch the N-type power switch transistor.

11. The load driving apparatus as claimed in claim 10, wherein the transformer further has a second secondary side, and the PWM-based power converter further comprises:

a third rectification-filtering circuit, coupled to the second secondary side, and configured to rectify and filter an AC induction voltage on the second secondary side, so as to generate and output a DC working voltage; and a voltage-current control circuit, coupled to outputs of the second and the third rectification-filtering circuits, the determination circuit and a low-side of the LED lamp, and operated under the DC working voltage, wherein the voltage-current control circuit is configured to:

control the current flowing through the LED lamp in response to the dimming signal, so as to adjust the brightness of the LED lamp; and provide the lamp-off reference signal.

12. The load driving apparatus as claimed in claim 11, further comprising:

a dimmer, coupled to the determination circuit and the voltage-current control circuit, and configured to provide the dimming signal.

13. The load driving apparatus as claimed in claim 10, wherein the PWM-based power converter further comprises:

an electromagnetic interference filter, coupled between the AC input voltage and the first rectification-filtering circuit, and configured to:

filter an electromagnetic interference of the AC input voltage, or prevent the PWM-based power converter from polluting a public power grid network that supplies the AC input voltage.

14. A load driving method, at least adapted to a light-emitting diode (LED) lamp, the load driving method comprising:

providing a direct current (DC) operation current of the LED lamp under a pulse width modulation (PWM)-based structure;

providing a dimming signal to control a current flowing through the LED lamp in response to a dimming requirement, so as to adjust a brightness of the LED lamp; and stopping conducting the DC operation voltage to the LED lamp in case that a lamp-off condition of the LED lamp is satisfied.

15. The load driving method as claimed in claim 14, further comprising:

conducting the DC operation voltage to the LED lamp in case that a lamp-on condition of the LED lamp is satisfied.

16. The load driving method as claimed in claim 15, wherein when a level of the dimming signal is higher than a level of a lamp-off reference signal, the lamp-on condition of the LED lamp is satisfied, and when the level of the dimming signal is lower than the level of the lamp-off reference signal, the lamp-off condition of the LED lamp is satisfied.

17. The load driving method as claimed in claim 14, further comprising:

stopping conducting the DC operation voltage to the LED lamp when the LED lamp is shorted.

* * * * *